United States Patent
Kosugi et al.

(10) Patent No.: US 11,287,856 B2
(45) Date of Patent: Mar. 29, 2022

(54) ELECTRONIC APPARATUS AND CONTROLLING METHOD

(71) Applicant: LENOVO (SINGAPORE) PTE. LTD., Singapore (SG)

(72) Inventors: Kazuhiro Kosugi, Yokohama (JP); Masashi Nishio, Yokohama (JP); Mamoru Okada, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 173 days.

(21) Appl. No.: 16/713,243

(22) Filed: Dec. 13, 2019

(65) Prior Publication Data

US 2020/0201401 A1 Jun. 25, 2020

(30) Foreign Application Priority Data

Dec. 25, 2018 (JP) .............................. JP2018-241655

(51) Int. Cl.
*G06F 1/26* (2006.01)
*G06F 1/32* (2019.01)
*G06F 1/16* (2006.01)
*G05B 15/02* (2006.01)

(52) U.S. Cl.
CPC ........... *G06F 1/1694* (2013.01); *G05B 15/02* (2013.01)

(58) Field of Classification Search
CPC ..... G05B 15/02; G06F 1/1694; G06F 1/1616; G06F 1/3231; Y02D 10/00
See application file for complete search history.

(56) References Cited

U.S. PATENT DOCUMENTS

| | | | | |
|---|---|---|---|---|
| 9,600,054 | B2* | 3/2017 | Ono | G06F 1/3284 |
| 2010/0231390 | A1* | 9/2010 | Hashimoto | G03G 15/5004 340/573.1 |
| 2012/0328319 | A1* | 12/2012 | Ogata | G03G 15/5091 399/75 |
| 2013/0222611 | A1* | 8/2013 | Hsu | H04N 5/232411 348/207.1 |
| 2016/0142575 | A1* | 5/2016 | Yokoyama | H04W 4/80 358/1.15 |
| 2017/0163847 | A1* | 6/2017 | Ogura | H04N 1/00891 |
| 2020/0210206 | A1* | 7/2020 | Kosugi | G06F 9/4418 |
| 2020/0356154 | A1* | 11/2020 | Kosugi | G06K 9/00771 |
| 2020/0363857 | A1* | 11/2020 | Kosugi | G06F 1/1616 |

FOREIGN PATENT DOCUMENTS

| | | | |
|---|---|---|---|
| JP | 2003255922 | A | 9/2003 |
| JP | 2012238093 | A | 12/2012 |
| JP | 2015174296 | A | 10/2015 |
| JP | 2016087921 | A | 5/2016 |
| JP | 2018018445 | A | 2/2018 |
| JP | 2018165054 | A | 10/2018 |

* cited by examiner

*Primary Examiner* — Zhipeng Wang
(74) *Attorney, Agent, or Firm* — Shimokaji IP

(57) ABSTRACT

An electronic apparatus includes: a processing unit which executes system processing; a detection unit which detects an object present within a predetermined detection range; an operation control unit which activates the operation of the processing unit when the object is detected within the predetermined range by the detection unit; and a detection range control unit which sets the predetermined detection range according to the operating state of the system processing.

4 Claims, 6 Drawing Sheets

| MODE | DETECTION ANGLE OF VIEW | MAXIMUM DETECTION DISTANCE |
|---|---|---|
| LEAVE DETECTION MODE | 120° | 120cm |
| APPROACH DETECTION MODE | 30° | 60cm |

ELECTRONIC APPARATUS AND CONTROLLING METHOD

FIELD OF THE INVENTION

The present invention relates to an electronic apparatus and a control method.

BACKGROUND OF THE INVENTION

There is an electronic apparatus such as a PC (Personal Computer) including a proximity sensor (PS) used to detect the approach of a person, where the electronic apparatus boots up when the approach of the person is detected. As the proximity sensor, for example, an infrared (IR) sensor is used. A user can boot such an electronic apparatus merely by approaching the electronic apparatus without a touch thereto. For example, Japanese Unexamined Patent Application Publication No. 2003-255922 discloses a terminal processing device which displays an operation screen in response to detecting an approaching person.

SUMMARY OF THE INVENTION

However, persons approaching the electronic apparatus can include not only a person using the electronic apparatus but also any other person who cuts across in front of the electronic apparatus by chance. Therefore, as described above, the electronic apparatus which detects the approach of a person and boots up may boot up unnecessarily even when any person other than the person using the electronic apparatus cuts across in front of the electronic apparatus by chance. On the other hand, when the person using the electronic apparatus leaves the electronic apparatus, it is desired to turn the display of the electronic apparatus OFF and make a transition to a standby state from the viewpoint of security and power consumption. However, the person using the electronic apparatus is not always staying neatly in front of the electronic apparatus and tends to move freely. Therefore, when the leave of the person from the electronic apparatus is detected, there is a possibility to detect the leave of the person erroneously due to changes in posture of the person or the like despite the fact that the person is using the electronic apparatus.

The present invention has been made in view of the above circumstances, and it is an object thereof to provide an electronic apparatus and a control method, which detect the approach and leave of a person using the electronic apparatus more reliably.

The present invention has been made to solve the above problem, and an electronic apparatus according to the first aspect of the present invention includes: a processing unit which executes system processing; a detection unit which detects an object present within a predetermined detection range; an operation control unit which activates the operation of the processing unit when the object is detected within the predetermined range by the detection unit; and a detection range control unit which sets the predetermined detection range according to an operating state of the system processing.

The above electronic apparatus may also be such that, when the operating state of the system processing is a first operating state, the detection range control unit sets the predetermined detection range to a first detection range, while when the operating state of the system processing is a second operating state in which at least part of the system processing is more limited than that in the first operating state, the detection range control unit sets the predetermined detection range to a second detection range narrower than the first detection range.

An electronic apparatus according to the second aspect of the present invention includes: a processing unit which executes system processing; a detection unit which detects an object present within a predetermined detection range; an operation control unit which activates the operation of the processing unit when the object is detected within the predetermined range by the detection unit; and a detection range control unit which sets the predetermined detection range according to a detection state of the object by the detection unit.

The above electronic apparatus may also be such that, when the detection state by the detection unit is such a state that the object is being detected, the detection range control unit sets the predetermined detection range to a first detection range, while when the detection state by the detection unit is such a state that the object is not detected, the detection range control unit sets the predetermined detection range to a second detection range narrower than the first detection range.

In the above electronic apparatuses, the detection range control unit may also control the second detection range to be narrower in detection angle of view than the first detection range.

In the above electronic apparatuses, the detection range control unit may further control the second detection range to be shorter in detection distance than the first detection range.

A control method according to the third aspect of the present invention is a control method for an electronic apparatus including a processing unit which executes system processing, the control method including: a step of causing a detection unit to detect an object present within a predetermined detection range; a step of causing an operation control unit to activate the operation of the processing unit when the object is detected within the predetermined range; and a step of causing a detection range control unit to set the predetermined detection range according to an operating state of the system processing.

A control method according to the fourth aspect of the present invention is a control method for an electronic apparatus including a processing unit which executes system processing, the control method including: a step of causing a detection unit to detect an object present within a predetermined detection range; a step of causing an operation control unit to activate the operation of the processing unit when the object is detected within the predetermined range; and a step of causing a detection range control unit to set the predetermined detection range according to a detection state of the object by the detection unit.

A program according to the fifth aspect of the present invention is a program causing a computer as an electronic apparatus including a processing unit which executes system processing to execute: a step of detecting an object present within a predetermined detection range; a step of activating the operation of the processing unit when the object is detected within the predetermined range; and a step of setting the predetermined detection range according to an operating state of the system processing.

A program according to the sixth aspect of the present invention is a program causing a computer as an electronic apparatus including a processing unit which executes system processing to execute: a step of detecting an object present within a predetermined detection range; a step of activating the operation of the processing unit when the object is detected within the predetermined range; and a step of setting the predetermined detection range according to a detection state of the object.

The above-described aspects of the present invention can detect the approach and leave of a person using an electronic apparatus more reliably.

DETAILED DESCRIPTION OF THE INVENTION

First Embodiment

First, the outline of an electronic apparatus 1 according to a first embodiment will be described with reference to the accompanying drawings. The electronic apparatus 1 according to the embodiment is, for example, an information processing apparatus such as a laptop PC (Personal Computer). Note that the electronic apparatus 1 may be an information processing apparatus of any other form, such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is an operating state in which at least part of system processing is limited. For example, the standby state is a state in which at least the display of a display unit appears to be OFF, which is an operating state lower in power consumption than the normal operating state. The standby state may be the standby state or a sleep state, or a state corresponding to modern standby in Windows (registered trademark) or S3 state (sleep state) defined in the ACPI specification. Further, in the standby state, a hibernation state, a power-off state, or the like may also be included. The hibernation state corresponds, for example, to S4 state defined in the ACPI specification. The power-off state corresponds, for example, to S5 state (shutdown state) defined in the ACPI specification.

In the following, a transition of the system operating state from the standby state to the normal operating state may be called "boot." In the standby state, since the activation level is generally lower than the normal operating state, the boot of the system of the electronic apparatus 1 to start system processing leads to the activation of the operation of system processing in the electronic apparatus 1.

Figure 1A:
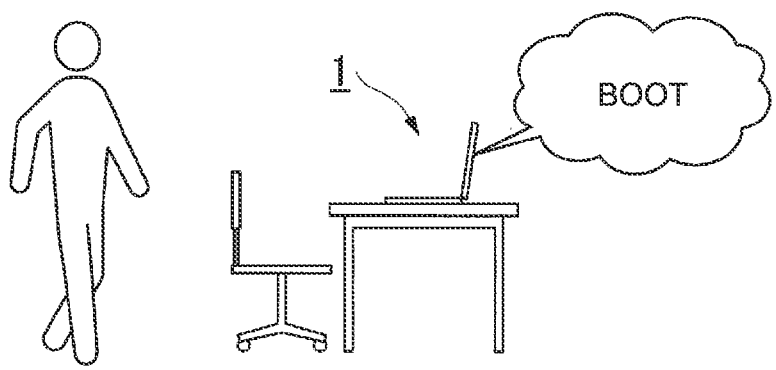
FIGS. 1A to 1C are a diagram for describing the outline of an electronic apparatus according to a first embodiment.
Figure 1B:
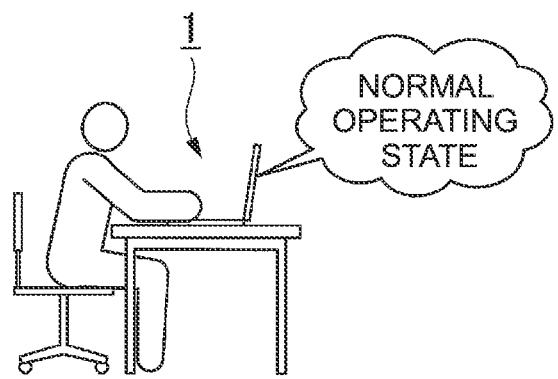
Figure 1C:
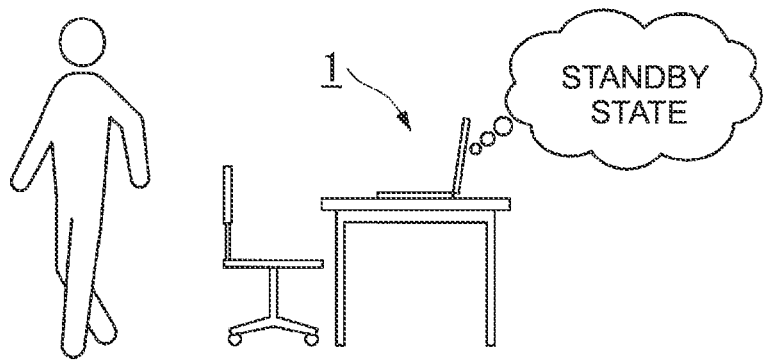

FIG. 1A to 1C are a diagram for describing the outline of the electronic apparatus 1 according to the embodiment. The electronic apparatus 1 includes a proximity sensor to be described later to detect a person present in the neighborhood of the electronic apparatus 1. This processing for detecting the presence of a person may also be called HPD (Human Presence Detection) processing. The electronic apparatus 1 detects a person present in the neighborhood of the electronic apparatus 1 to control the operating state of the electronic apparatus 1 based on the detection result. For example, as illustrated in FIG. 1A, when detecting that a person approaches the electronic apparatus 1 (Approach), the electronic apparatus 1 automatically boots the system to start system processing. Further, in a state where the person is present in front of the electronic apparatus 1 (Presence) as illustrated in FIG. 1B, the electronic apparatus 1 limits system processing not to make a transition to the standby state and to continue the normal operating state. Then, when it is detected that the person has left the electronic apparatus 1 (Leave) as illustrated in FIG. 1C, the electronic apparatus 1 causes the system processing to make the transition to the standby state.

(External Structure of Electronic Apparatus)

Figures 2, 3:
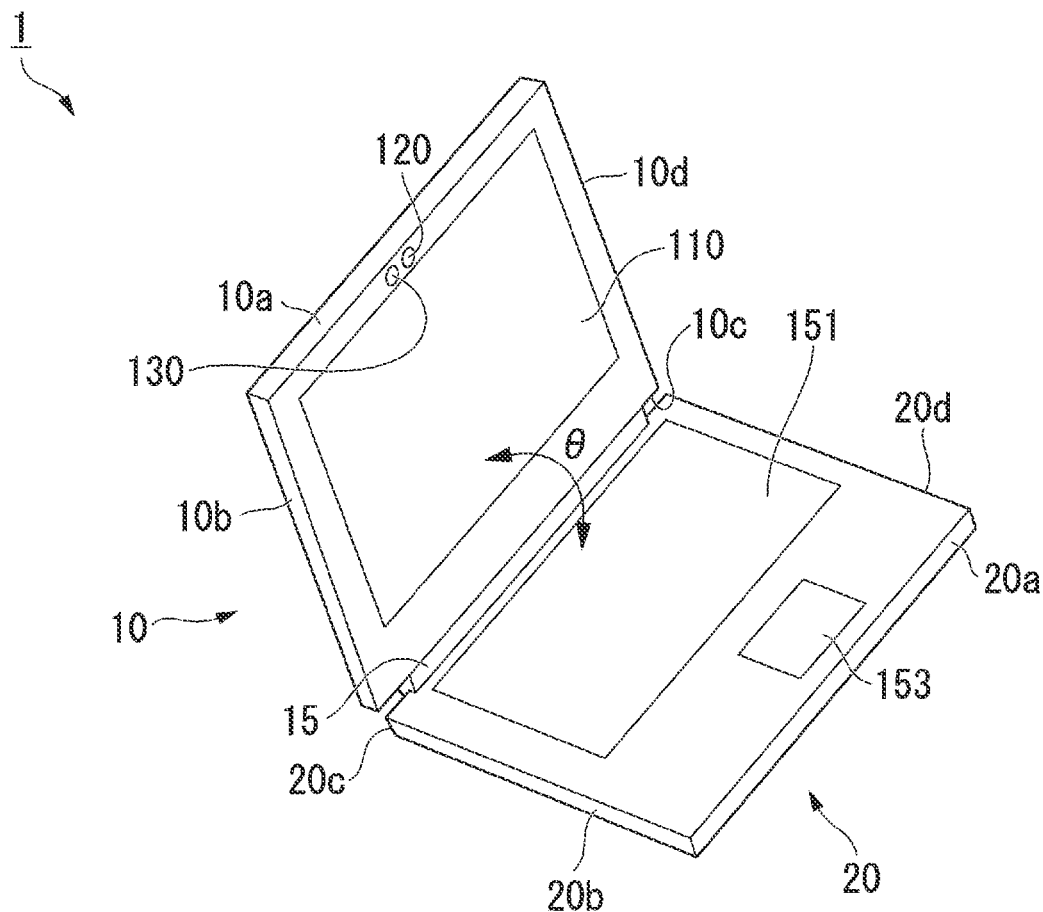
FIG. 2 is a perspective view illustrating an external structure example of the electronic apparatus according to the first embodiment.
FIG. 3 is a table illustrating an example of setting data of sensor detection ranges.

FIG. 2 is a perspective view illustrating an external structure example of the electronic apparatus 1 according to the embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c toward the side face 20a is referred to as "front." The right hand and left hand in the rearward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open is referred to as an "open state."

The external appearance of the electronic apparatus 1 in FIG. 2 illustrates an example of the open state. The open state is a state where the side face 10a of the first chassis 10 and the side face 20a of the second chassis 20 are separated. In the open state, the inner faces of the first chassis 10 and the second chassis 20 appear so that the electronic apparatus 1 will be expected to be able to carry out normal operation. The open state is a state where the open angle θ between the inner face of the first chassis 10 and the inner face of the second chassis 20 is equal to or more than a predetermined angle, typically about 100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 and a proximity sensor 130 are provided in a peripheral area of the display unit 110 on the inner face of the first chassis 10. The imaging unit 120 and the proximity sensor 130 are arranged side by side on the side of the side face 10a in the peripheral area of the display unit 110. Note that the proximity sensor 130 may be arranged on the side of the side face 10c in the peripheral area of the display unit 110.

In the open state, the imaging unit 120 captures an image of an object within a predetermined angle of view in a direction (frontward) to face the inner face of the first chassis 10. The predetermined angle of view is an imaging angle of view defined by an image sensor included in the imaging unit 120 and an optical lens provided in front of an imaging surface of the image sensor.

The proximity sensor 130 detects an object (for example, a person) present in the neighborhood of the electronic apparatus 1. For example, the proximity sensor 130 is an infrared distance sensor configured to include a light-emitting part for emitting infrared light and a light-receiving part for receiving reflected light which is the infrared light returned after being emitted and reflected on the surface of the object. The proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light, a ToF (Time of Flight) method for converting, to a distance, a time difference from light-emitting to light-receiving, or the like.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and it may be a sensor using any other method, such as an ultrasonic sensor or a sensor using an UWB (Ultra Wide Band) radar, as long as the sensor detects a distance to the object.

A keyboard 151 and a touch pad 153 are provided as an input device on the inner face of the second chassis 20. Note that a touch sensor may be included as the input device instead of or in addition to the keyboard 151 and the touch pad 153, or a mouse and an external keyboard may be connected. When the touch sensor is provided, an operation area in which the touch sensor accepts operations may be an area corresponding to the display surface of the display unit 110. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling the functions thereof. In the state where the first chassis 10 and the second chassis 20 are completely closed, the open angle θ is 0°.

(Detection Range of Proximity Sensor)

Here, the detection range of the proximity sensor 130 will be described. In the open state, the proximity sensor 130 arranged on the inner face of the first chassis 10 detects an object (for example, a person) in a direction (frontward) to face the inner face of the first chassis 10. In the following, the detection range detectable by the proximity sensor 130 is called a sensor detection range. The sensor detection range can be defined by a detection field of view FoV indicative of an angle detectable by the proximity sensor 130 and the maximum detection distance KLm indicative of the maximum distance detectable by the proximity sensor 130.

The electronic apparatus 1 sets the sensor detection range to detection ranges different between a case where the leave of a person from the electronic apparatus 1 is detected and a case where the approach of the person to the electronic apparatus 1 is detected. In the following, a detection mode in which the leave of a person from the electronic apparatus 1 is detected is called a leave detection mode. Further, a detection mode in which the approach of the person to the electronic apparatus 1 is detected is called an approach detection mode.

In the leave detection mode, since the person using the electronic apparatus 1 is not always staying neatly in front of the electronic apparatus 1 and tends to move freely, it is preferred to set the sensor detection range to a wide range so that the person will not fall out of the sensor detection range at all times even if the person moves to some extent. On the other hand, in the approach detection mode, it is preferred to set the sensor detection range to a narrow range so that any person other than the person using the electronic apparatus 1 cuts across in front of the electronic apparatus 1 by chance will not fall within the sensor detection range. Thus, in the electronic apparatus 1, the sensor detection range of the approach detection mode is set narrower than the sensor detection range of the leave detection mode.

Figure 4:
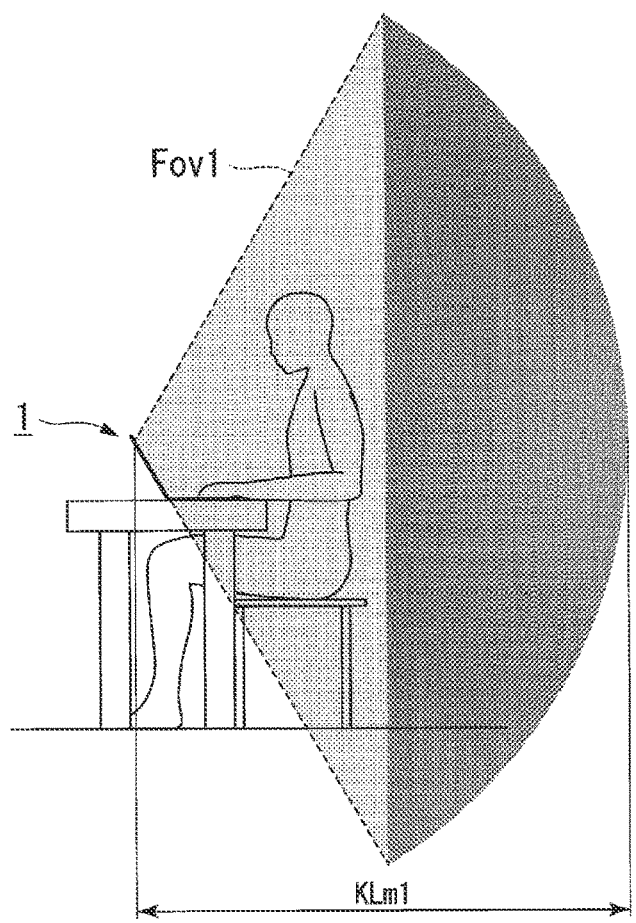
FIG. 4 is a diagram illustrating a sensor detection range of a leave detection mode.
Figure 5:
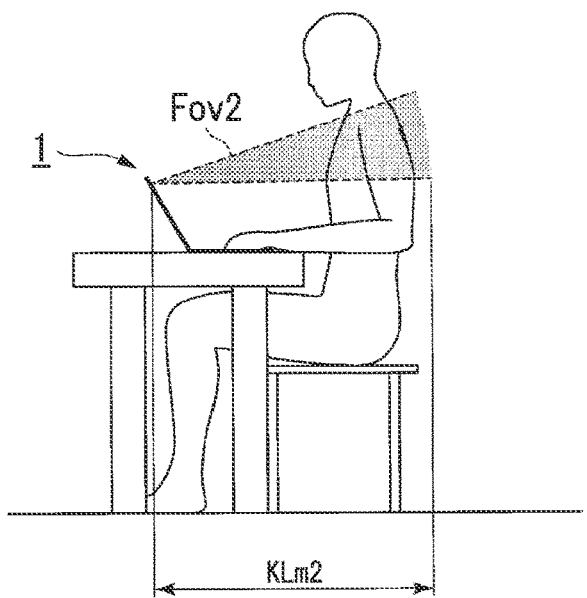
FIG. 5 is a diagram illustrating a sensor detection range of an approach detection mode.

Referring next to FIG. 3 to FIG. 5, a specific example of the settings of sensor detection ranges will be described.

FIG. 3 is a table illustrating an example of setting data of sensor detection ranges. FIG. 4 is a diagram illustrating a sensor detection range in the leave detection mode. FIG. 5 is a diagram illustrating a sensor detection range in the approach detection mode. As illustrated in FIG. 4, the sensor detection range of the leave detection mode is defined by a detection angle of view Fov1 and a maximum detection distance KLm1. On the other hand, as illustrated in FIG. 5, the sensor detection range of the approach detection mode is defined by a detection angle of view Fov2 and a maximum detection distance KLm2.

The detection angle of view Fov2 in the approach detection mode is set to an angle narrower than the detection angle of view Fov1 in the leave detection mode. As an example, the detection angle of view Fov1 in the leave detection mode is set to 120° and the detection angle of view Fov2 in the approach detection mode is set to 30° as illustrated in FIG. 3. Further, the maximum detection distance KLm2 in the approach detection mode is set to a distance shorter than the maximum detection distance KLm1 in the leave detection mode. As an example, the maximum detection distance KLm1 in the leave detection mode is set to 120 cm and the maximum detection distance KLm2 in the approach detection mode is set to 60 cm as illustrated in FIG. 3.

Here, the proximity sensor 130 changes a sweeping (scanning) range as the detection range to change the detection angle of view Fov. For example, in the case of the infrared distance sensor, the proximity sensor 130 changes a range used for detection within the range of a light-receiving area of the light-receiving part for receiving reflected light returned after being reflected on the surface of an object to change the detection angle of view Fov. In the case of detection using the whole light-receiving area, the detection angle of view Fov is the maximum, and the detection angle of view Fov can be narrowed by narrowing the range of the light-receiving area. Note that power consumption in the proximity sensor 130 may be able to be suppressed by making the detection angle of view Fov narrower. Further, the proximity sensor 130 changes output (for example, the amount of infrared light emission) to an object (for example, a person) to be detected to change the maximum detection distance KLm. The proximity sensor 130 increases the amount of infrared light emission to lengthen the maximum detection distance KLm and decreases the amount of infrared light emission to shorten the maximum detection distance KLm. As the maximum detection distance KLm is made shorter, power consumption in the proximity sensor 130 can be more suppressed.

Figure 6:
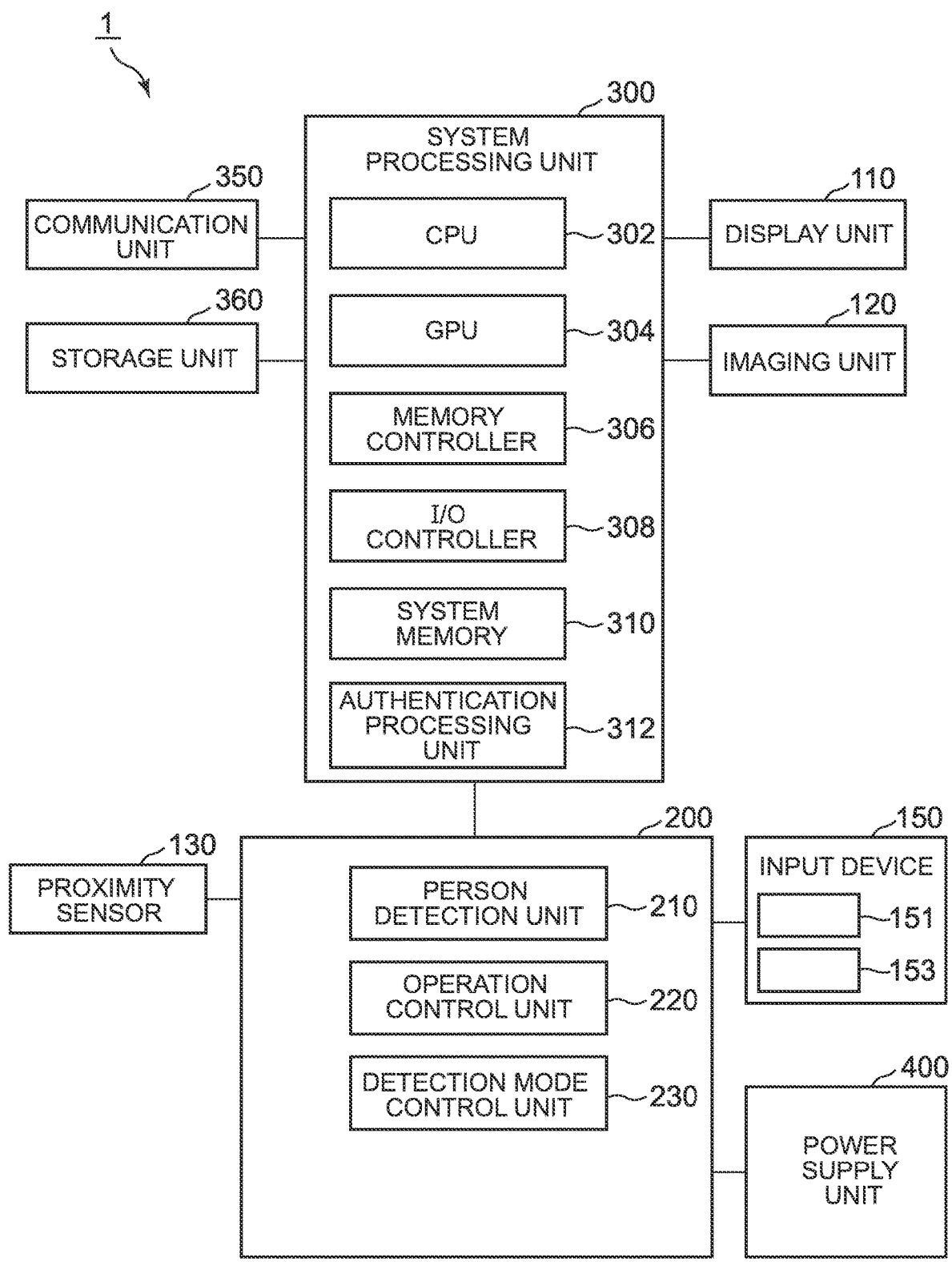
FIG. 6 is a schematic block diagram illustrating a hardware configuration example of the electronic apparatus according to the first embodiment.

(Hardware Configuration of Electronic Apparatus) FIG. 6 is a schematic block diagram illustrating a hardware configuration example of the electronic apparatus 1 according to the embodiment. The electronic apparatus 1 is configured to include the display unit 110, the imaging unit 120, the proximity sensor 130, an input device 150, an EC (Embedded Controller) 200, a system processing unit 300, a communication unit 350, a storage unit 360, and a power supply unit 400. The display unit 110 displays display data generated by system processing executed by the system processing unit 300.

The imaging unit 120 captures an image of an object within a predetermined angle of view in a direction (frontward) to face the inner face of the first chassis 10, and outputs the captured image to the system processing unit 300. For example, when the face of a person approaching the electronic apparatus 1 is contained within the angle of view of the imaging unit 120, the imaging unit 120 captures a face image of the person, and outputs the captured face image to the system processing unit 300. The imaging unit 120 may be an infrared camera or a normal camera. The infrared camera is a camera including an infrared sensor as an image sensor. The normal camera is a camera including, as an image sensor, a visible light sensor for receiving a visible light beam.

The proximity sensor 130 detects an object (for example, a person) present in a direction (frontward) to face the inner face of the first chassis 10, and outputs, to the EC 200, a detection signal indicative of the detection result.

The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU, a RAM (Random Access Memory), a ROM (Read Only Memory), an I/O (Input/Output) logic circuit, and the like. The CPU of the EC 200 reads a control program prestored in the ROM thereof and executes the read control program to fulfill the function. The EC 200 operates independently of the system processing unit 300 to control the operation of the system processing unit 300 and manage the operating state of the system processing unit 300. The EC 200 is connected to the proximity sensor 130, the input device 150, and the power supply unit 400.

For example, the EC 200 controls the sensor detection range of the proximity sensor 130. The EC 200 acquires a detection signal indicative of the detection result from the proximity sensor 130 to control the operating state of the system processing unit 300 based on the detection result. Further, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the input device 150, and outputs, to the system processing unit 300, an operation signal related to processing of the system processing unit 300 among the acquired operation signals. For example, as a functional configuration related to the HPD processing, the EC 200 includes a person detection unit 210, an operation control unit 220, and a detection mode control unit 230.

Based on the detection result of the proximity sensor 130 with a predetermined sampling frequency (for example, 1 Hz), the person detection unit 210 detects an object (for example, a person) present in front of the electronic apparatus 1. In the following description, the fact that the person detection unit 210 detects an object (for example, a person) may be simply called that the person detection unit 210 detects a person. In other words, the fact that the person detection unit 210 detects a person includes both that the person detection unit 210 detects a person and that the person detection unit 210 detects an object other than the person. For example, based on a detection signal acquired from the proximity sensor 130, the person detection unit 210 detects a distance to a person present within the predetermined range in front of the electronic apparatus 1. The predetermined range is a person detection range set as a range of the person detection unit 210 to detect a person. For example, the person detection range corresponds to the sensor detection range of the proximity sensor 130.

For example, based on the detection signal acquired from the proximity sensor 130, the person detection unit 210 detects whether a person is present within the person detection range or not. Then, when the person is present, the person detection unit 210 detects the distance from the proximity sensor 130 to the person. Specifically, when a detection signal according to the distance to the person is acquired from the proximity sensor 130, the detection unit 210 detects that the person is present within the person detection range, and detects the distance to the person. On the other hand, when the detection signal according to the distance to the person cannot be acquired from the proximity sensor 130, the person detection unit 210 detects that the person is not present within the person detection range.

Further, when a person is detected after no person is detected within the person detection range, the person detection unit 210 determines that the person approaches in front of the electronic apparatus 1, and detects the approach of the person to the electronic apparatus 1. Further, when a person is continuously being detected after the person is detected within the person detection range, the person detection unit 210 determines that the person is present in front of the electronic apparatus 1. Further, when the person is no longer detected after the person is being detected within the person detection range, the person detection unit 210 determines that the person who was present in front of the electronic apparatus 1 has left, and detects the leave of the person from the electronic apparatus 1.

When a person is detected within the person detection range by the person detection unit 210, the operation control unit 220 boots the system to start system processing by the system processing unit 300.

Specifically, when the person detection unit 210 detects a person after detecting no person within the person detection range (that is, when the person detection unit 210 detects the approach of the person to the electronic apparatus 1), the operation control unit 220 boots the system to start system processing. More specifically, when booting the system to start system processing by the system processing unit 300, the operation control unit 220 outputs a control signal to the power supply unit 400 to supply power necessary for the operation of each unit of the electronic apparatus 1. After that, the operation control unit 220 outputs a boot signal to the system processing unit 300 to give an instruction to boot the system in order to start system processing. When acquiring the boot signal, the system processing unit 300 boots the system to cause the system processing to make a transition to the normal operating state.

Further, when the person detection unit 210 is continuously detecting the person within the person detection range, the operation control unit 220 limits the system processing by the system processing unit 300 not to make a transition to the standby state and to continue the normal operating state. However, even when the person detection unit 210 is continuously detecting the person within the person detection range, the operation control unit 220 may make the transition from the normal operating state to the standby state depending on a predetermined condition (for example, when the duration of non-operation has last for a preset period of time).

Further, when the person detection unit 210 no longer detects the person after detecting the person within the person detection range (that is, when detecting the leave of the person from the electronic apparatus 1), the operation control unit 220 causes the system processing by the system processing unit 300 to make the transition from the normal operating state to the standby state. More specifically, the operation control unit 220 outputs a standby signal to the system processing unit 300 to give an instruction to cause the system processing to make the transition from the normal operating state to the standby state. When acquiring the standby signal, the system processing unit 300 causes the system processing to make the transition from the normal operating state to the standby state. After that, the operation control unit 220 outputs a control signal to the power supply unit 400 to stop the supply of power unnecessary in the standby state.

The detection mode control unit 230 set the sensor detection range according to the operating state of the system processing. For example, when the operating state of the system processing is the normal operating state, the detection mode control unit 230 sets the sensor detection range to the detection range of the leave detection mode (see FIG. 3 and FIG. 4). On the other hand, when the operating state of the system processing is the standby state, the detection mode control unit 230 sets the sensor detection range to the detection range of the approach detection mode (see FIG. 3 and FIG. 5).

The system processing unit 300 is configured to include a CPU 302, a GPU (Graphic Processing Unit) 304, a memory controller 306, an I/O (Input-Output) controller 308, a system memory 310, and an authentication processing unit 312, where processes of various application software are executable on an operating system (OS) by system processing based on the OS. The CPU 302 and the GPU 304 may be collectively called a processor.

As described above, the transition can be made at least between the normal operating state (power-on state) and the standby state as system operating states. The standby state, a sleep state, a hibernation state, and a power-off state are included as standby states.

The standby state is an operating state in which the processing power of the processor is made lower than that in the normal operating state to make the power consumption of the peripheral devices, such as the communication unit 350, the storage unit 360, and the display unit 110, lower than those in the normal operating state while holding the contents of the working system memory 310.

The sleep state is an operating mode in which the supply of power to devices other than the system memory 310, the EC 200, and devices subordinate to the system memory 310 and the EC 200 is stopped without execution of programs by the processor.

The hibernation state is a mode in which all pieces of information stored in the system memory 310 are saved to an auxiliary storage device accessible immediately from the processor in the sleep state, and after that, the supply of power to the system memory 310 is further stopped. Therefore, upon starting boot processing from the hibernation state, the CPU 302 stores, in the system memory 310, the information saved in the auxiliary storage device.

The power-off state is a state in which the supply of power to devices other than the EC 200 and devices subordinate to the EC 200 is stopped.

When the operating state of the system processing is the standby state and the boot signal is input from the EC 200, the CPU 302 makes a transition from the standby state to the normal operating state. For example, in the case where the operating state is the sleep state, the hibernation state, or the power-off state, when power is supplied from the power supply unit 400 and the boot signal is input from the EC 200, the CPU 302 starts the boot processing. In the boot processing, the CPU 302 detects and initializes the minimum devices such as the system memory 310, the storage unit 360, and the like (pre-boot). Then, the CPU 302 loads system firmware from the storage unit 360 into the system memory 310 to detect and initialize the other devices such as the communication unit 350 and the display unit 110 (post-processing).

Initialization includes processing such as initial parameter settings. In the case of a transition (resume) from the sleep state to the normal operating state, part of the post-processing may be omitted. After completion of the boot processing, the CPU 302 starts execution of the system processing based on the OS (boot). For example, when the operating state is the standby state and the boot signal is input from the EC 200, the CPU 302 resumes the execution of software the execution of which has been stopped.

When the execution of the system processing by the OS is started, the CPU 302 executes login authentication processing before allowing access to the OS, and pauses the execution of the subsequent system processing until login is allowed in the login authentication processing. The login authentication processing is user authentication processing for determining whether the person using the electronic apparatus 1 is a preregistered, authorized user or not. As the login authentication, there are password authentication, face authentication, fingerprint authentication, and the like. Here, an example of using face authentication processing will be described. The CPU 302 instructs the authentication processing unit 312 to execute the face authentication processing based on a face image of the person captured by the imaging unit 120. When the authentication result by the authentication processing unit 312 is successful, the CPU 302 allows the login, and resumes the execution of the paused system processing. On the other hand, when the authentication result by the authentication processing unit 312 is unsuccessful, the login is not allowed, and the execution of the system processing remains paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

When receiving an instruction to execute the face authentication processing from the CPU 302, the authentication processing unit 312 executes the face authentication processing based on the face image of the person captured by the imaging unit 120. The face image of the person captured by the imaging unit 120 is the face image of a person who approaches from the front of the electronic apparatus 1. The face authentication processing includes face detection processing and face matching processing. The face detection processing is processing for defining a face area as an area of a face from an image signal input from the imaging unit 120. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in with the account. The authentication information includes image feature values of the face image of the user. The authentication information is stored in further association with user information indicating the user. The user information may be information capable of identifying the user of the electronic apparatus 1, such as a user name, a user ID (Identifier), or the like.

As a result of matching the face image of the person captured by the imaging unit 120 with the set authentication information on the user, when it can be determined to match with each other, the authentication processing unit 312 determines that the face authentication is successful. On the other hand, for example, when a person other than the person using the electronic apparatus 1 cuts across in front of the electronic apparatus 1 by chance, the authentication processing unit 312 detects no face area from the image captured by the imaging unit 120. The authentication processing unit 312 outputs, to the CPU 302 and the EC 200, authentication information indicative of success/failure of the face authentication.

The communication unit 350 is connected to other devices communicably through a wireless or wired communication network to send and receive various data. For example, the communication unit 350 is configured to include a wired LAN interface such as the Ethernet (registered trademark), a wireless LAN interface such as Wi-Fi (registered trademark), and the like. Note that the communication unit 350 may also be configured to include a USB (Universal Serial Bus) interface and a Bluetooth (registered trademark) interface.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

(Operation of Processing)

Next, the operation of processing according to the embodiment will be described.

Figure 7:
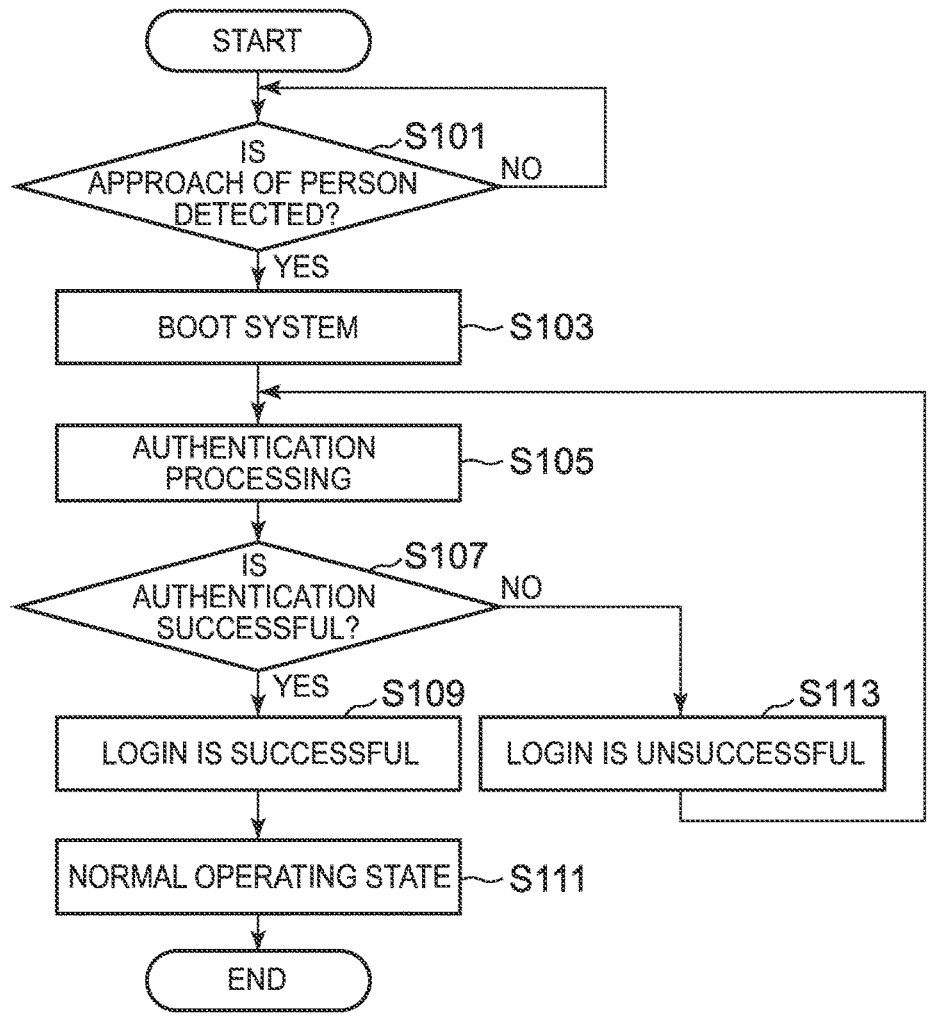
FIG. 7 is a flowchart illustrating an example of boot control according to the first embodiment.

First, the operation of boot processing to start the system processing performed when the electronic apparatus 1 detects the approach of a person will be described. FIG. 7 is a flowchart illustrating an example of boot control according to the embodiment. Here, it is assumed that the electronic apparatus 1 is placed open on a desk or the like in the standby state.

(Step S101) Based on a detection signal acquired from the proximity sensor 130, the person detection unit 210 determines whether the approach of a person to the electronic apparatus 1 is detected or not. When a person is detected after no person is detected within the person detection range, the person detection unit 210 determines that the approach of a person to the electronic apparatus 1 is detected. When no person remains detected within the person detection range, the person detection unit 210 determines that the approach of a person to the electronic apparatus 1 is not detected. Then, when determining that the approach of a person to the electronic apparatus 1 is not detected (NO), the person detection unit 210 performs processing in step S101 again. On the other hand, when determining that the approach of a person to the electronic apparatus 1 is detected (YES), the procedure proceeds to processing in step S103.

(Step S103) The operation control unit 220 boots the system to start system processing by the system processing unit 300. Specifically, when starting the system processing by the system processing unit 300, the operation control unit 220 outputs, to the power supply unit 400, the control signal to supply power necessary for the operation of each unit of the electronic apparatus 1. Further, the operation control unit 220 outputs the boot signal to instruct the CPU 302 to boot the system in order to start the system processing. When acquiring the boot signal, the CPU 302 starts boot processing. Then, the procedure proceeds to processing in step S105.

(Step S105) The CPU 302 executes login authentication. For example, the CPU 302 executes login authentication processing by face authentication using a face image of a person captured by the imaging unit 120. Specifically, the CPU 302 instructs the authentication processing unit 312 to execute face authentication processing based on the face image of the person captured by the imaging unit 120, and acquires the authentication result from the authentication processing unit 312. Then, the procedure proceeds to processing in step S107.

(Step S107) The CPU 302 determines whether the authentication result is successful or not. When the authentication result is successful (YES), the CPU 302 proceeds to processing in step S109. On the other hand, when the authentication result is unsuccessful (NO), the CPU 302 proceeds to processing in step S113.

(Step S109) The CPU 302 gives a notification that the login is successful (for example, displays the notification on the display unit 110) when the authentication result is successful to continue the boot processing. Then, the procedure proceeds to processing in step S111.

(Step S111) The CPU 302 ends the boot processing and makes a transition to the normal operating state.

(Step S113) The CPU 302 gives a notification that the login is unsuccessful (for example, displays the notification on the display unit 110) when the authentication result is unsuccessful, and returns to the authentication processing in step S105. When the authentication processing is unsuccessful continuously a predetermined number of times, the CPU 302 may stop the authentication processing and make a transition to a state of disabling the execution of the login authentication processing.

Next, the operation of standby-state transition processing to cause the system processing to make a transition from the normal operating state to the standby state when the leave of a person from the electronic apparatus 1 is detected will be described.

Figure 8:
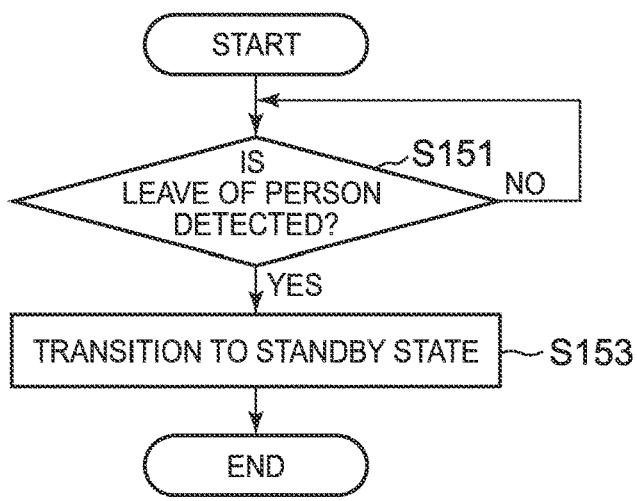
FIG. 8 is a flowchart illustrating an example of standby-state transition processing according to the first embodiment.

FIG. 8 is a flowchart illustrating an example of standby-state transition processing according to the embodiment. Here, it is assumed that the electronic apparatus 1 is placed open on the desk or the like in the normal operating state.

(Step S151) Based on the detection signal acquired from the proximity sensor 130, the person detection unit 210 determines whether the leave of a person from the electronic apparatus 1 is detected or not. For example, when a person is no longer detected after the person is being detected within the person detection range, the person detection unit 210 determines that the leave of the person from the electronic apparatus 1 is detected. On the other hand, when the person remains detected within the person detection range, the person detection unit 210 determines that the leave of the person from the electronic apparatus 1 is not detected. Then, when the leave of the person from the electronic apparatus 1 is not detected (NO), the person detection unit 210 performs processing in step S151 again. On the other hand, when the leave of the person from the electronic apparatus 1 is detected (YES), the procedure proceeds to processing in step S153.

(Step S153) The operation control unit 220 causes the system processing by the system processing unit 300 to make the transition from the normal operating state to the standby state. Specifically, the operation control unit 220 outputs a standby signal to instruct the CPU 302 to cause the system processing to make the transition to the standby state. When acquiring the standby signal, the CPU 302 makes the transition from the normal operating state to the standby state. Further, the operation control unit 220 outputs, to the power supply unit 400, the control signal to stop the supply of power unnecessary in the standby state.

Next, the operation of sensor detection range control processing to change the sensor detection range of the proximity sensor 130 will be described.

Figure 9:
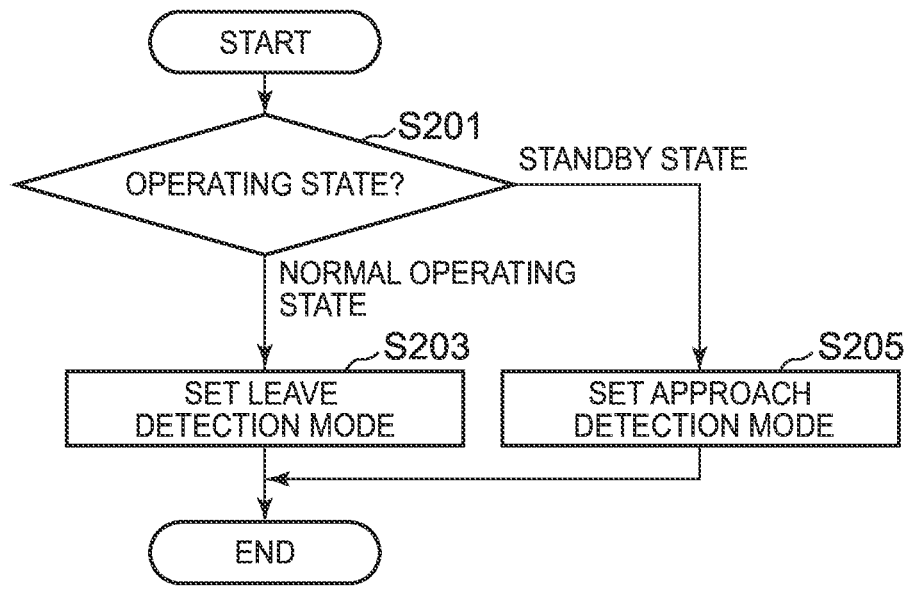
FIG. 9 is a flowchart illustrating an example of sensor detection range control processing according to the first embodiment.

FIG. 9 is a flowchart illustrating an example of sensor detection range control processing according to the embodiment.

(Step S201) The detection mode control unit 230 acquires, from the system processing unit 300, information indicative of the operating state of system processing, and determines whether the operating state of the system processing is the normal operating state or the standby state. When determining the normal operating state, the detection mode control unit 230 proceeds to processing in step S203. On the other hand, when determining the standby state, the detection mode control unit 230 proceeds to processing in step S205.

(Step S203) In the case of the normal operating state, the detection mode control unit 230 sets the sensor detection range to a detection range of the leave detection mode (see FIG. 3 and FIG. 4). Thus, when the electronic apparatus 1 is in the normal operating state because the person is using the electronic apparatus 1, the electronic apparatus 1 detects the leave of the person in a wide sensor detection range of the leave detection mode.

(Step S205) In the case of the standby state, the detection mode control unit 230 sets the sensor detection range to a detection range of the approach detection mode (see FIG. 3 and FIG. 5). Thus, when the electronic apparatus 1 is in the standby state because of the absence of a person in the neighborhood of the electronic apparatus 1, the electronic apparatus 1 detects the approach of a person in a narrow sensor detection range of the approach detection mode.

As described above, in the electronic apparatus 1 according to the embodiment, the system processing unit 300 (an example of a processing unit) executes system processing. The person detection unit 210 (an example of a detection unit) detects an object (for example, a person) present within the person detection range (an example of a predetermined detection range). When an object (for example, a person) is detected within the person detection range by the person detection unit 210, the operation control unit 220 activates the operation of system processing by the system processing unit 300. Then, the detection mode control unit 230 (an example of a detection range control unit) sets the person detection range according to the operating state of the system processing by the system processing unit 330. For example, the person detection range corresponds to the sensor detection range of the proximity sensor 130.

Thus, since the electronic apparatus 1 sets the person detection range according to the operating state of the system processing, the approach and leave of the person using the electronic apparatus 1 can be detected more reliably.

For example, when the operating state of the system processing is the normal operating state (an example of a first operating state), the detection mode control unit 230 sets the person detection range to the detection range of the leave detection mode (an example of a first detection range). Further, when the operating state of the system processing is the standby state (an example of a second operating state) in which at least part of the system processing is more limited than in the normal operating state, the detection mode control unit 230 sets the person detection range to the detection range of the approach detection mode (an example of a second detection range) narrower than the detection range of the leave detection mode.

Thus, when the system processing is in the normal operating state (that is, when the leave of the person is to be detected), since the person is detected in a relatively wide detection range, the electronic apparatus 1 can be prevented from making a transition to the standby state due to the fact that the person falls out of the detection range merely by moving to some extent. Further, when the system processing is in the standby state (that is, when the approach of a person is to be detected), since the person is detected in a relatively narrow detection range, the electronic apparatus 1 can be prevented from booting up due to the fact that a person other than the person using the electronic apparatus 1 cuts across in front of the electronic apparatus 1 by chance and hence falls within the detection range. Therefore, the electronic apparatus 1 can detect the approach and leave of the person using the electronic apparatus 1 more reliably.

For example, the detection mode control unit 230 controls the detection range of the approach detection mode to be narrower in detection angle of view Fov than the detection range of the leave detection mode. Thus, since a person is detected in a relatively narrow detection angle of view when the approach of the person is to be detected, the electronic apparatus 1 can be prevented from booting up due to the fact that a person other than the person using the electronic apparatus 1 cuts across in front of the electronic apparatus 1 by chance and hence falls within the detection range.

The detection mode control unit 230 may also control the detection range of the approach detection mode to be shorter in maximum detection distance KLm than the detection range of the leave detection mode. Thus, since a person is detected within a relatively short distance when the approach of the person is detected, the electronic apparatus 1 can be prevented from booting up due to the fact that a person other than the person using the electronic apparatus 1 cuts across in front of the electronic apparatus 1 by chance and hence falls within the detection range.

Note that the detection mode control unit 230 may control both the detection angle of view Fov and the maximum detection distance KLm or either one of them according to the operating state of the system processing.

Second Embodiment

Next, a second embodiment of the present invention will be described.

Since the basic configuration of the electronic apparatus 1 according to this embodiment is the same as that in the first embodiment, characteristic processing in this embodiment will be described. In the first embodiment, the sensor detection range is controlled depending on whether the operating state of the system processing is the normal operating state or the standby state, while in this embodiment, an example of controlling the sensor detection range depending on whether an object (for example, a person) is being detected or not will be described.

The state where a person is being detected is the normal operating state of the electronic apparatus 1 because the person is using the electronic apparatus 1. Therefore, in such a state that the person is being detected, the electronic apparatus 1 will detect the leave of the person. On the other hand, the state where any person is not detected is the standby state of the electronic apparatus 1 because the person is absent in the neighborhood of the electronic apparatus 1. Therefore, in such a state that any person is not detected, the electronic apparatus 1 will detect the approach of a person.

The detection mode control unit 230 sets the sensor detection range according to the detection state by the person detection unit 210. For example, when the detection state by the person detection unit 210 is such a state that a person is being detected, the detection mode control unit 230 sets the sensor detection range to the detection range of the leave detection mode (see FIG. 3 and FIG. 4). On the other hand, when the detection state by the person detection unit 210 is such a state that any person is not detected, the detection mode control unit 230 sets the sensor detection range to the detection range of the approach detection mode (see FIG. 3 and FIG. 5).

Figure 10:
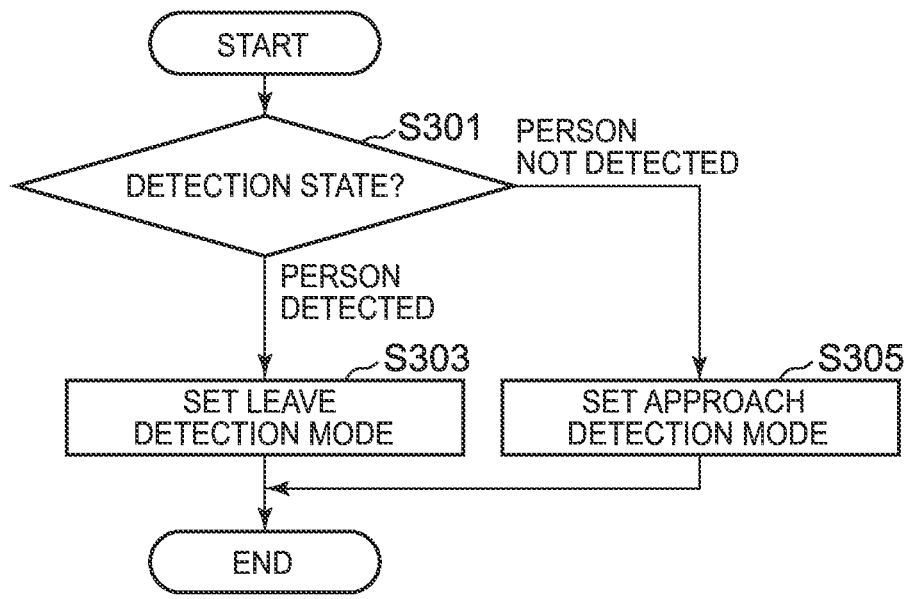
FIG. 10 is a flowchart illustrating an example of sensor detection range control processing according to a second embodiment.

FIG. 10 is a flowchart illustrating an example of sensor detection range control processing according to the embodiment.

(Step S301) The detection mode control unit 230 acquires information indicative of a person detection state from the person detection unit 210, and determines whether the detection state by the person detection unit 210 is such a state that a person is being detected, or such a state that any person is not detected. When determining the state where a person is being detected (person detected), the detection mode control unit 230 proceeds to processing in step S303. On the other hand, when determining the state where any person is not detected, the detection mode control unit 230 proceeds to processing in step S305.

(Step S303) In the state where a person is being detected, the detection mode control unit 230 sets the sensor detection range to the detection range of the leave detection mode (see FIG. 3 and FIG. 4). Thus, in the state where a person is being detected because the person is using the electronic apparatus 1, the electronic apparatus 1 detects the leave of the person in the wide sensor detection range of the leave detection mode.

(Step S305) In the state where any person is not detected, the detection mode control unit 230 sets the sensor detection range to the detection range of the approach detection mode (see FIG. 3 and FIG. 5). Thus, in the state where any person is not detected because no person is present in the neighborhood of the electronic apparatus 1, the electronic apparatus 1 detects the approach of a person in the narrow sensor detection range of the approach detection mode.

Thus, in the electronic apparatus 1 according to the embodiment, the detection mode control unit 230 (the example of the detection range control unit) sets the person detection range according to the detection state of an object (for example, a person) by the person detection unit 210. For example, the person detection range corresponds to the sensor detection range of the proximity sensor 130. Since the person detection range is set according to the person detection state, the electronic apparatus 1 can detect the approach and leave of a person using the electronic apparatus 1 more reliably.

For example, when the detection state by the person detection unit 210 is such a state that an object (for example, a person) is being detected, the detection mode control unit 230 sets the person detection range to the detection range of the leave detection mode (the example of the first detection range). Further, when the detection state by the person detection unit 210 is such a state that any object (for example, any person) is not detected, the detection mode control unit 230 sets the person detection range to the detection range of the approach detection mode (the example of the second detection range) narrower than the detection range of the leave detection mode.

Thus, when a person is being detected (that is, when the leave of the person is to be detected), since the electronic apparatus 1 detects a person in the relatively wide detection range, the electronic apparatus 1 can be prevented from making a transition to the standby state due to the fact that the person falls out of the detection range merely by moving to some extent. Further, when any person is not detected (that is, when the approach of a person is to be detected), since the electronic apparatus 1 detects a person in the relatively narrow detection range, the electronic apparatus 1 can be prevented from booting up due to the fact that a person other than the person using the electronic apparatus 1 cuts across in front of the electronic apparatus 1 by chance and hence falls within the detection range. Thus, the electronic apparatus 1 can detect the approach and leave of a person using the electronic apparatus 1 more reliably.

For example, the detection mode control unit 230 controls the detection range of the approach detection mode to be narrower in detection angle of view Fov than the detection range of the leave detection mode. Thus, when the approach of a person is to be detected, since the electronic apparatus 1 detects a person in the relatively narrow detection angle of view, the electronic apparatus 1 can be prevented from booting up due to the fact that a person other than the person using the electronic apparatus 1 cuts across in front of the electronic apparatus 1 by chance and hence falls within the detection range.

The detection mode control unit 230 may also control the detection range of the approach detection mode to be shorter in maximum detection distance KLm than the detection range of the leave detection mode. In this case, since the electronic apparatus 1 detects a person within a relatively short detection distance when the approach of the person is to be detected, the electronic apparatus 1 can be prevented from booting up due to the fact that a person other than the person using the electronic apparatus 1 cuts across in front of the electronic apparatus 1 by chance and hence falls within the detection range.

Note that the detection mode control unit 230 may control both the detection angle of view Fov and the maximum detection distance KLm or either one of them according to the detection state by the person detection unit 210.

While the embodiments of this invention have been described in detail above with reference to the accompanying drawings, the specific configuration is not limited to that in the above-described embodiments, and design changes and the like are included without departing from the scope of this invention. The respective components described in the above-described embodiments can be combined arbitrarily.

Further, in the aforementioned embodiments, the example in which the person detection unit 210 achieves detection in a person detection range of up to the maximum detection distance KLm has been described, but a limit may also be set on the minimum distance side of the person detection range. For example, among objects (for example, persons) detected by the proximity sensor 130, the person detection unit 210 may also set, as a detection target, only an object (for example, a person) detected in a range of not less than a preset distance (for example, 10 cm) to not more than the maximum detection distance (KLm1, KLm2). In this case, the electronic apparatus 1 is able not to detect an object (for example, a person), which is too close and different from the status of use by an authorized user, as the approach of a person using the electronic apparatus 1 (a person who approaches with the intention of using the electronic apparatus 1, i.e., the user).

Further, in the aforementioned embodiments, the example of changing the sensor detection range of the proximity sensor 130 between the case where the approach of a person is detected and the case where the leave of the person is detected has been described, but the person detection range in which the person detection unit 210 detects a person in response to the sensor detection range may also be changed without changing the sensor detection range. In this case, since the sensor detection range of the proximity sensor 130 is not changed between the approach detection mode and the leave detection mod, power consumed for detection does not change. Although the power-saving effect on detection in the standby state is not obtained, the detection accuracies of approach and leave detections are the same as those in the first embodiment, so that the approach and leave of a person using the electronic apparatus 1 can be detected more reliably.

Further, in the aforementioned embodiments, the example of changing the person detection range between the case where the approach of a person is detected and the case where the leave of the person is detected has been described, but the detection cycle (sampling cycle) may also be changed instead of or in addition to the change in detection range. For example, the detection mode control unit 230 may set the sampling cycle of the leave detection mode to a cycle longer than the sampling cycle of the approach detection mode. In this case, the electronic apparatus 1 can quickly detect the approach of a person and boot up. Further, in the case of the leave of a person, since the necessity of quick transition to the standby state is less than necessity upon boot, power consumption necessary for detection can be reduced.

Further, in the above embodiments, the EC 200 operating independently of the system processing unit 300 may be any processing unit such as a sensor hub or a chipset, and the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300.

Note that the above-described standby state may also include a state in which an image preset to make a processed content invisible (for example, an image for screen lock) is displayed on the display unit 110 (so-called screen lock state). Further, the activation of the operation of the system processing is not limited to the boot of the system to start the system processing, and it may be the release of the screen lock of the display unit 110, the start of providing a display to the display unit 110 or increasing the brightness of the display screen being already displayed, the start of execution of a predetermined application, or the like.

Note that the electronic apparatus 1 described above has a computer system therein. Then, a program for implementing the function of each component included in the electronic apparatus 1 described above may be recorded on a computer-readable recording medium so that the program recorded on this recording medium will be read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

The invention claimed is:

1. An electronic apparatus comprising:
a processor coupled to a memory and configured to execute an operating system;
an infrared distance sensor configured to detect an object present within a detection range;
an embedded controller separate from the processor, the embedded controller being coupled to the infrared distance sensor, wherein the embedded controller is programmed to:
control a detection range of the infrared distance sensor to have a first field of view angle when the operation system is in a first operating state, and
control the detection range of the infrared distance sensor to have a second field of view angle when the operation system is in a second operating state with limited operating capabilities compared to the first operating state, and
the second field of view angle is narrower than the first field of view angle.

2. The electronic apparatus according to claim 1, wherein the embedded controller is further programmed to:
control the detection range of the infrared distance sensor to have a first detection distance when the operation system is in the first operating state, and
control the detection range of the infrared distance sensor to have a second detection distance when the operation system is in the second operating state, and
the second detection distance is shorter than the first detection distance.

3. An electronic apparatus comprising:
a processor coupled to a memory and configured to execute an operating system;
an infrared distance sensor configured to detect an object present within a detection range;
an embedded controller separate from the processor, the embedded controller being coupled to the infrared distance sensor, wherein the embedded controller is programmed to:
control a detection range of the infrared distance sensor to have a first field of view angle while the object is being detected by the infrared distance sensor, and
control the detection range of the infrared distance sensor to have a second field of view angle while the object is not being detected by the infrared distance sensor, and
the second field of view angle is narrower than the first field of view angle.

4. The electronic apparatus according to claim 3, wherein the embedded controller is further programmed to:
control the detection range of the infrared distance sensor to have a first detection distance while the object is being detected by the infrared distance sensor, and
control the detection range of the infrared distance sensor to have a second detection distance while the object is not being detected by the infrared distance sensor, and
the second detection distance is shorter than the first detection distance.

* * * * *